US007844305B2

(12) United States Patent
Godston et al.

(10) Patent No.: US 7,844,305 B2
(45) Date of Patent: Nov. 30, 2010

(54) METHOD AND APPARATUS FOR GENERATING POWER IN A MOBILE COMMUNICATION DEVICE

(75) Inventors: Jon Godston, Chicago, IL (US); Erik A. Cholewin, Libertyville, IL (US); Brian J. Hassemer, Gurnee, IL (US); Mark D. Janninck, Glen Ellyn, IL (US); John B. Van Den Nieuwenhuizen, San Francisco, CA (US)

(73) Assignee: Motorola, Inc., Schaumburg, IL (US)

( * ) Notice: Subject to any disclaimer, the term of this patent is extended or adjusted under 35 U.S.C. 154(b) by 537 days.

(21) Appl. No.: 11/875,376

(22) Filed: Oct. 19, 2007

(65) Prior Publication Data

US 2009/0104947 A1   Apr. 23, 2009

(51) Int. Cl.
*H04M 1/00* (2006.01)

(52) U.S. Cl. .................. 455/572; 455/573; 455/574; 455/299; 379/322

(58) Field of Classification Search ............. 455/572, 455/573, 574, 299, 575.1, 127.1, 343.1; 379/322, 379/330; 320/107
See application file for complete search history.

(56) References Cited

U.S. PATENT DOCUMENTS

| 3,612,776 | A | * | 10/1971 | Ban ............................ 369/11 |
| 3,829,781 | A | * | 8/1974 | Letson et al. ................. 455/98 |
| 5,982,577 | A | * | 11/1999 | Brown et al. ................ 360/96.3 |
| 6,522,040 | B2 | * | 2/2003 | You ............................ 310/96 |
| 6,771,946 | B1 | * | 8/2004 | Oyaski ....................... 455/345 |
| 6,785,935 | B2 | * | 9/2004 | Ahn et al. .................... 16/221 |
| 6,804,171 | B2 | * | 10/2004 | Miyazawa et al. .......... 368/204 |
| 6,914,340 | B2 | * | 7/2005 | Becker et al. ................ 290/1 R |
| 7,120,463 | B2 | * | 10/2006 | Mathews ..................... 455/557 |
| 7,266,390 | B2 | * | 9/2007 | Mathews ................... 455/556.1 |
| 7,276,805 | B2 | * | 10/2007 | Poon ........................... 290/1 E |
| 7,428,430 | B2 | * | 9/2008 | Ahn et al. ................. 455/575.4 |
| 7,679,320 | B2 | * | 3/2010 | Yu et al. ..................... 320/114 |
| 2002/0042292 | A1 | * | 4/2002 | Hama ......................... 455/572 |
| 2003/0087677 | A1 | * | 5/2003 | Miller et al. ................ 455/572 |
| 2003/0206497 | A1 | * | 11/2003 | Miyazawa et al. .......... 368/204 |
| 2005/0009572 | A1 | * | 1/2005 | Ahn et al. ................... 455/566 |
| 2005/0266800 | A1 | * | 12/2005 | Mathews .................... 455/66.1 |
| 2005/0266801 | A1 | * | 12/2005 | Mathews .................... 455/66.1 |
| 2006/0250043 | A1 | * | 11/2006 | Chung ........................ 310/216 |
| 2006/0256930 | A1 | * | 11/2006 | Park et al. ..................... 379/21 |
| 2007/0015487 | A1 | * | 1/2007 | Chigasaki et al. ........... 455/346 |
| 2007/0018609 | A1 | * | 1/2007 | Yen ............................. 320/107 |
| 2008/0075252 | A1 | * | 3/2008 | Yen ............................. 379/159 |
| 2010/0026142 | A1 | * | 2/2010 | Jones et al. ................. 310/339 |
| 2010/0060234 | A1 | * | 3/2010 | Nacson ....................... 320/114 |

FOREIGN PATENT DOCUMENTS

GB         2389719 A       12/2003

* cited by examiner

*Primary Examiner*—Minh D Dao
(74) *Attorney, Agent, or Firm*—Matthew C. Loppnow; Prass LLP

(57) ABSTRACT

An apparatus and a method of manufacturing an apparatus that creates power for a mobile communication device is disclosed. The apparatus may include a roller integrated into the mobile communication device configured to rotate in a counterclockwise direction when the roller contacts a surface and is moved in a first direction, and rotate in a clockwise direction when the roller contacts a surface and is moved in second direction, gearing connected to the roller, wherein the gearing rotates when the roller is moved, and one or more generator that creates power in the mobile communication device upon rotation of the roller and the gearing.

18 Claims, 5 Drawing Sheets

METHOD AND APPARATUS FOR GENERATING POWER IN A MOBILE COMMUNICATION DEVICE

BACKGROUND OF THE DISCLOSURE

1. Field of the Disclosure

The disclosure relates to powering mobile communication devices.

2. Introduction

Limited battery capacity prevents users from gaining full advantage of their phone's capabilities. For example, if the phone battery runs out of charge, and there is no charger or power outlet available, the user can no longer use his or her phone. In addition, users dislike carrying auxiliary items like chargers, such as wall outlet, solar or crank-style chargers. As a result, users are forced to conserve battery life, thereby limiting call or other feature usage, and thus creating consumer frustration by limiting access to the user's phone, phonebook, calendar, etc.

SUMMARY OF THE DISCLOSURE

An apparatus and a method of manufacturing an apparatus that that creates power for a mobile communication device is disclosed. The apparatus may include a roller integrated into the mobile communication device configured to rotate in a counterclockwise direction when the roller contacts a surface and is moved in a first direction, and rotates in a clockwise direction when the roller contacts a surface and is moved in second direction, gearing connected to the roller, wherein the gearing rotates when the roller is moved, and one or more generator that creates power in the mobile communication device upon rotation of the roller and the gearing.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF THE DISCLOSURE

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosure comprises a variety of embodiments, such as a method and apparatus and other embodiments that relate to the basic concepts of the disclosure.

This disclosure may concern a roller mechanism that may be integrated into a mobile communication device, such as a mobile phone, that acts as a battery charger. In this manner, a user may just roll the phone along a surface, in one direction or back and forth, to charge the phone by converting the mechanical energy into electrical or battery power. The roller mechanism may serve to generate power in a mobile communication device when the battery power has been depleted so that a user can make an emergency telephone call, for example. For example, a user may roll the mobile communication device for one minute to generate over two minutes of talk time.

Also, by integrating a roller mechanism on the mobile communication device, it may be possible to reduce battery size. In addition, a user may desire to increase battery power by using his or her nervous energy, spare time, etc. by rolling the phone to increase battery life.

From a technical perspective, the roller mechanism may combine energy generated by one or more generators, which may be driven by a gear-expansion connection to the roller mechanism. Other gearing and circuitry may exist depending on size constraints and other requirements.

Figure 1:
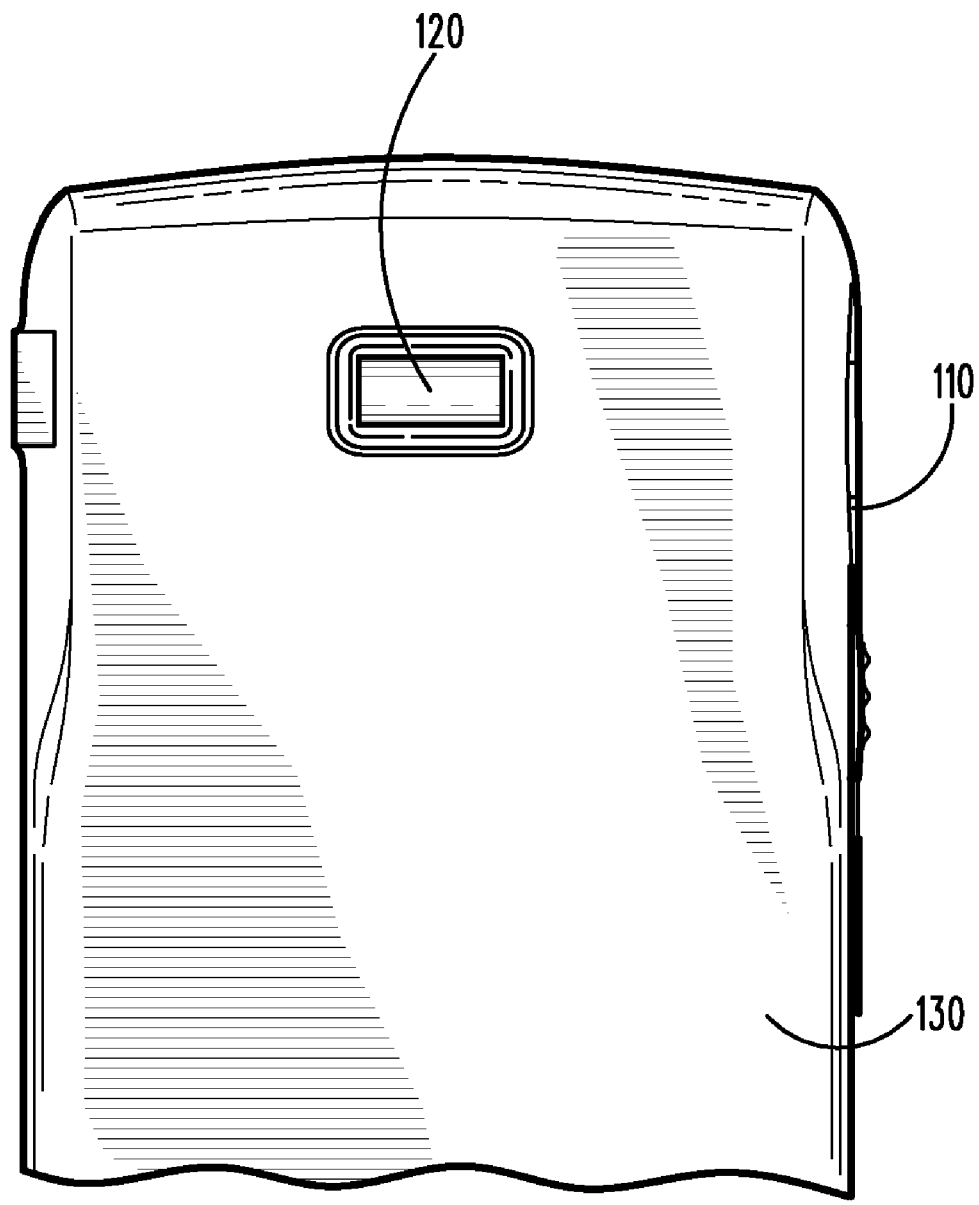
FIG. 1 illustrates a diagram of an exemplary mobile communication device in accordance with a possible embodiment of the disclosure.

FIG. 1 illustrates an exemplary diagram of the mobile communication device 100 in accordance with a possible embodiment of the disclosure. In particular, the mobile communication device 100 may include a chassis 110 and a roller 120, and battery cover 130. While the roller 120 is shown to be on the back of the mobile communication device 100, the roller 120 may be located on any side of the mobile communication device 100, including but not limited to, the back, front, right side, left side, top, and bottom.

The roller 120 may be configured to protrude out of the chassis 110, or out of a the battery cover 130, which may be user-replaceable. In addition, the roller 120 may also be configured to be retractable so that it is housed inside the mobile communication device 100 and protrude outside of the mobile communication device 100 upon the pressing of a button, lever, clicking on the roller itself, etc., located on the mobile communication device 100. Furthermore, the roller 120 may be part of a separate apparatus attachable to the mobile communication device 100 as needed.

The roller 120 may be integrated into the mobile communication device 100 and be configured to rotate in a counterclockwise direction when the roller 120 contacts a surface and is moved in a first direction, such as forward, backward, left, right, etc. and rotates in a clockwise direction when the roller contacts a surface and is moved in second direction, opposite the first direction, such as forward, backward, left, right, etc. depending on the first direction.

The mobile communication device 100 may be a portable MP3 player, satellite radio receiver, AM/FM radio receiver, satellite television, portable music player, portable computer, wireless radio, wireless telephone, portable digital video recorder, cellular telephone, mobile telephone, personal digital assistant (PDA), or combinations of the above, for example.

Figure 2A:
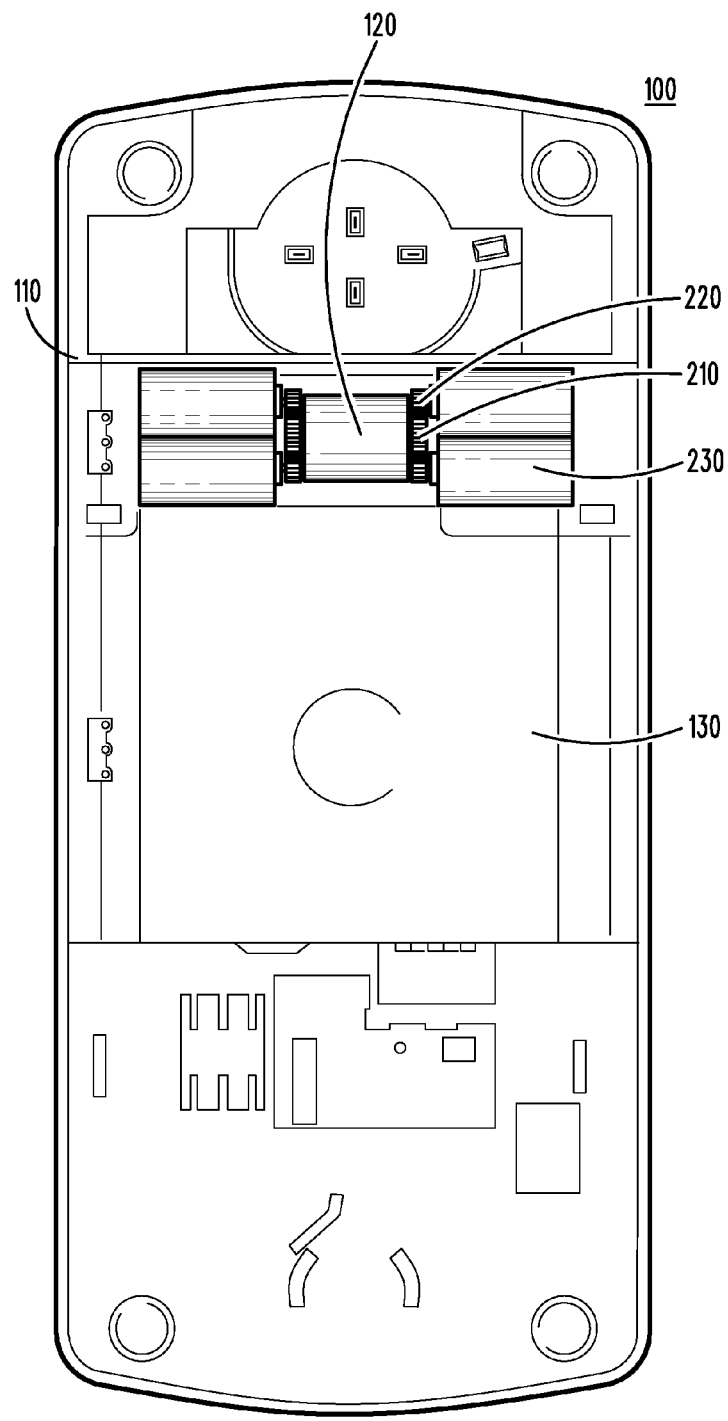
FIGS. 2A and 2B illustrate back and side views another diagram of an exemplary mobile communication device in accordance with a possible embodiment of the disclosure.
Figure 2B:
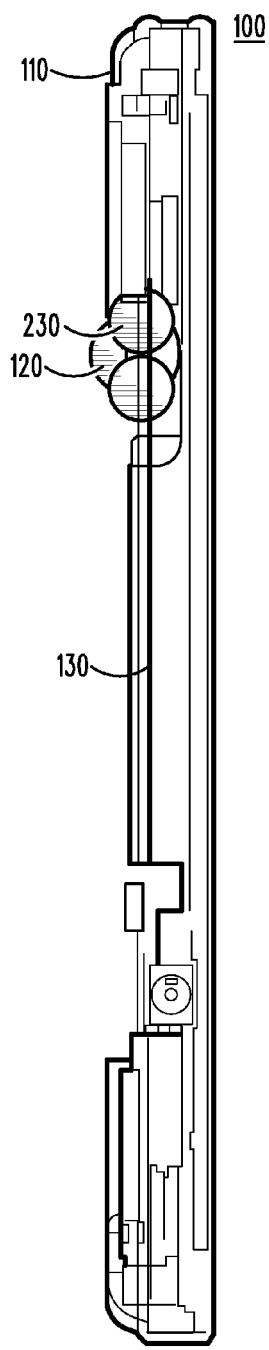

FIGS. 2A and 2B illustrate back and side views of another diagram of an exemplary mobile communication device 100 in accordance with a possible embodiment of the disclosure. The mobile communication device 100 may include chassis 110 and a roller 120, and battery cover 130, gearing in the form of one or more main gear 210, and one or more pinions 220, for example, and one or more generators 230.

Figure 3:
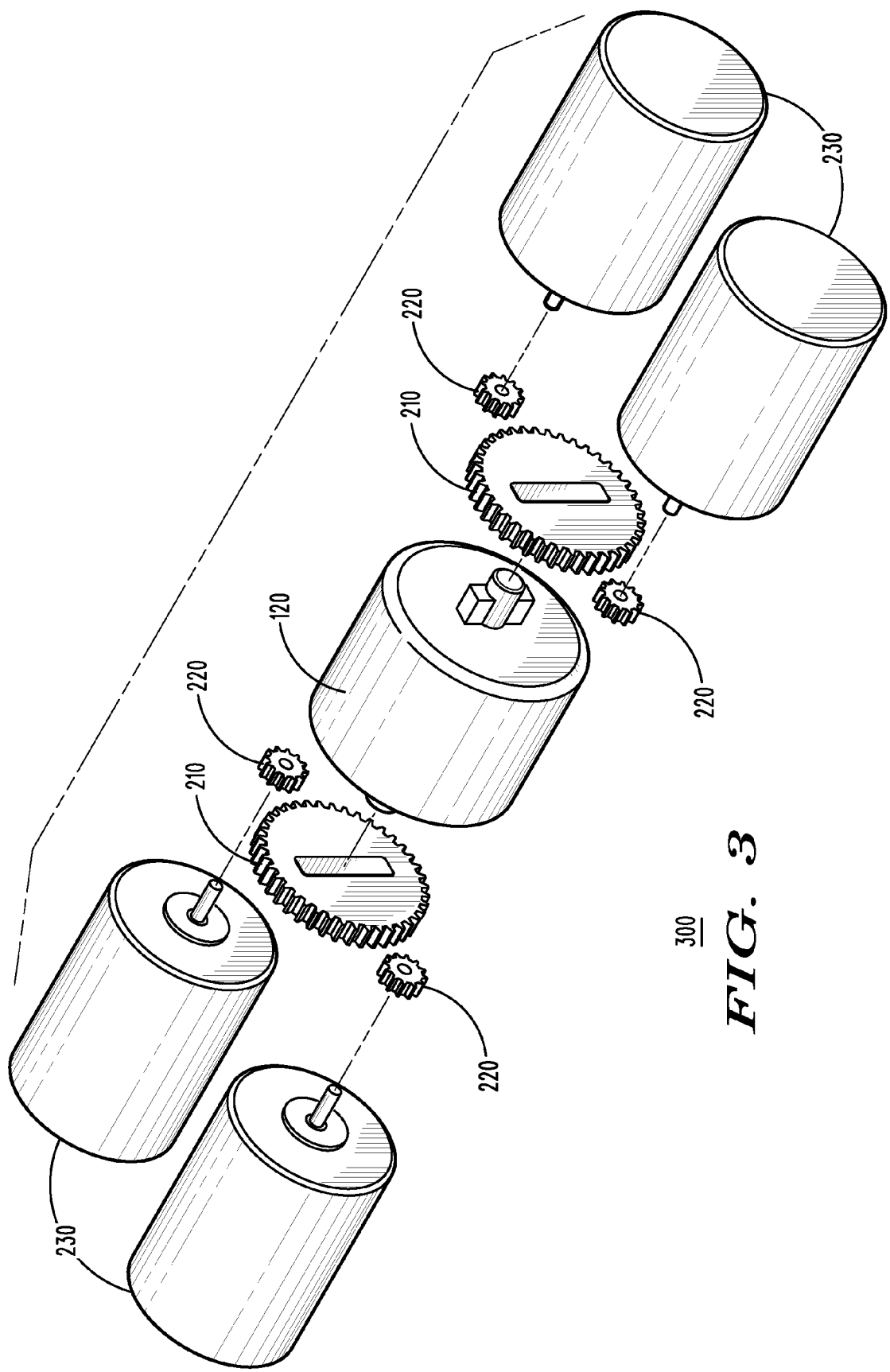
FIG. 3 illustrates a diagram of exemplary gearing in accordance with a possible embodiment of the disclosure.

FIG. 3 illustrates an exploded diagram of exemplary gearing 300 in accordance with a possible embodiment of the disclosure. The gearing 300 may include one or more main gear 210, and one or more pinions 220, for example, and one or more generators 230.

The one or more main gear 210 may be connected (or coupled) to the roller 120, such that when the roller 120 is moved, at least one of the main gears 210 rotates. The one or more pinions 220 may be connected to the one or more main gear 210, such that at least one of the pinions 220 rotate when the roller 120 and at least one of the main gear 210 move. The one or more generator 230 may create power in the mobile communication device 100 upon rotation of the roller 120 and the gearing 300 (one or more main gear 210 and one or more pinions 220, for example).

Note that while the figures show four generators 230, this is just illustrative. Any number of generators 230 may be used according to the spirit and scope of the disclosure.

Figure 4:
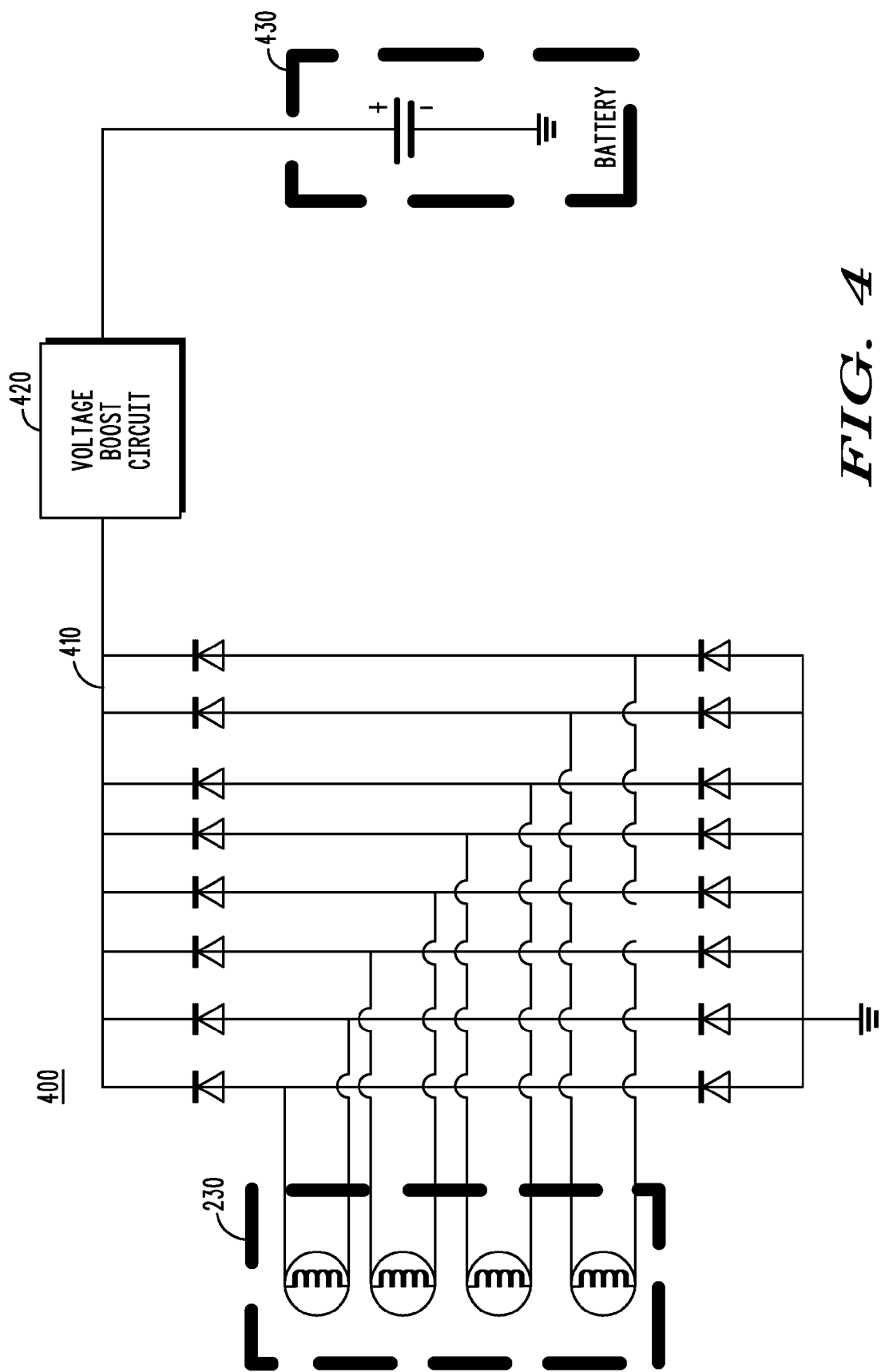
FIG. 4 illustrates a schematic diagram of the exemplary power generating circuitry in accordance with a possible embodiment of the disclosure.

FIG. 4 illustrates a schematic diagram of the exemplary power generating circuitry 400 in accordance with a possible embodiment of the disclosure. The power generating circuitry 400 may include one or more generator 230, diode array 410, voltage boost circuit 420, and battery 430.

The one or more generator 230 may be one or more direct current (DC) motors that may generate alternating current (AC) resulting from the movement of the roller 120.

The diode array 410 (or rectifier) may include a plurality of diodes configured to operate to convert AC current into DC current necessary for charging the mobile communication device 100.

The voltage boost circuit 420 may represent any electric circuitry capable of boosting the voltage to a level necessary to charge one or more batteries 430 of the mobile communication device 100.

The battery 430 may represent any battery 430 or DC power source that may serve to power the mobile communication device 100. The battery 430 may be internal or external to the mobile communication device 100. As an external battery, the battery 430 may be part of a device that may include the roller 120 and other components that attaches to the mobile communication device 100 for the purpose of providing power to the mobile communication device 100. Please also note that battery 430 may represent more than one battery.

While FIG. 4 shows a battery 430, the temporary power may be provided by charging one or more capacitors or other electronic components capable or holding a charge and releasing the charge to provide power to the mobile communication device 100.

Figure 5:
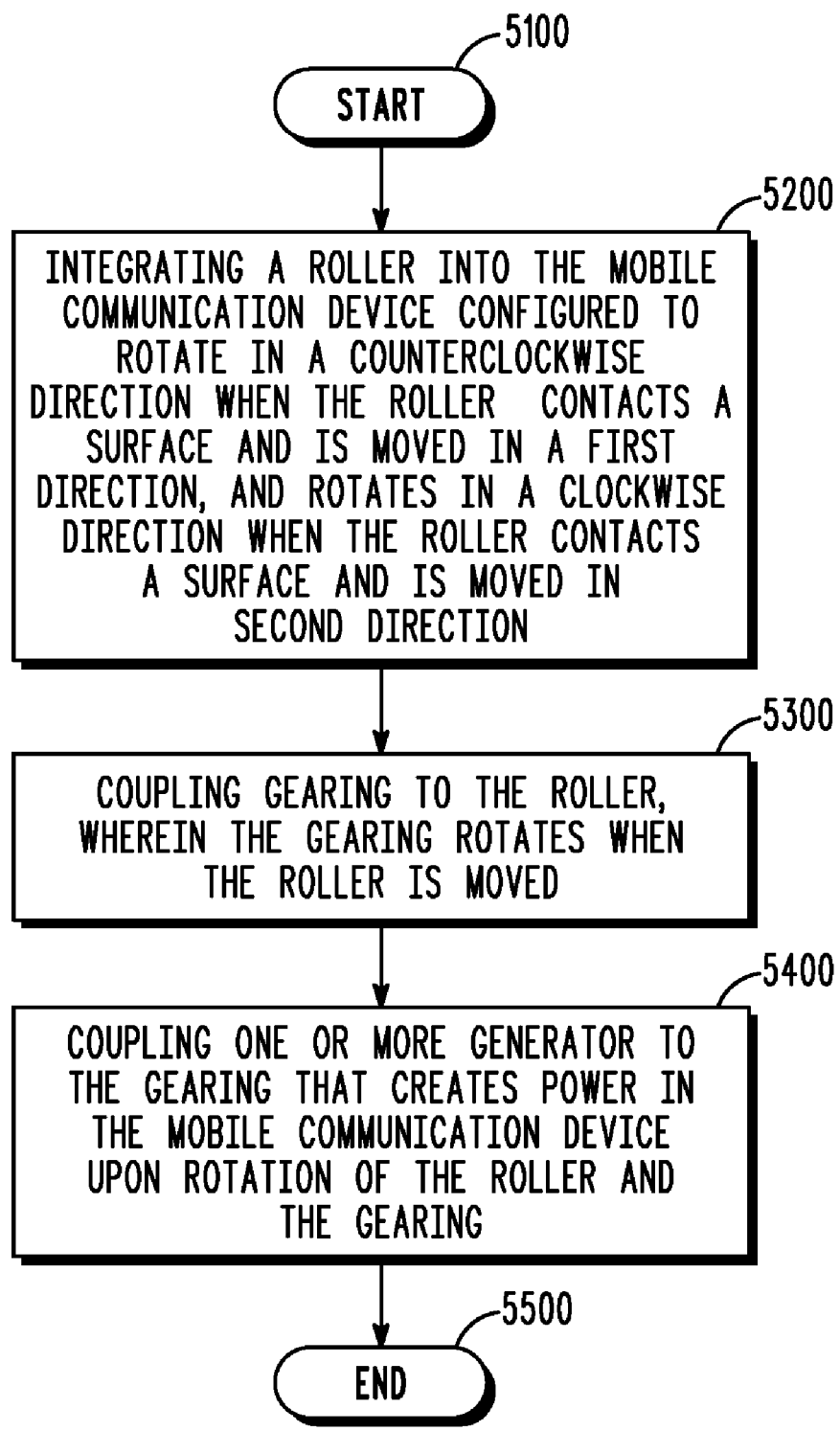
FIG. 5 is an exemplary flowchart illustrating one possible manufacturing process in accordance with one possible embodiment of the disclosure.

FIG. 5 is an exemplary flowchart illustrating one possible manufacturing process in accordance with one possible embodiment of the disclosure. The process begins at step 5100 and continues to step 5200 where the process may integrate a roller into the mobile communication device configured to rotate in a counterclockwise direction when the roller contacts a surface and is moved in a first direction, and rotate in a clockwise direction when the roller contacts a surface and is moved in second direction.

At step 5300, the process may couple gearing to the roller, wherein the gearing rotates when the roller is moved. At step 5400, the process may couple one or more generator to the gearing that creates power in the mobile communication device upon rotation of the roller and the gearing. The process then goes to step 5500 and ends.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the apparatus described herein. It does not necessarily need to be one system used by all end users. Accordingly, the appended claims and their legal equivalents should only define the disclosure, rather than any specific examples given.

We claim:

1. An apparatus for creating power for a mobile communication device, comprising:

a roller integrated into the mobile communication device, the roller configured to rotate in a counterclockwise direction about a roller axis of rotation when the roller contacts a surface and is moved in a first direction, and the roller configured to rotate in a clockwise direction when the roller contacts a surface and is moved in a second direction;

gearing connected to the roller, wherein the gearing rotates when the roller is moved, the gearing including:

at least one main gear coupled to the roller, the at least one main gear configured to rotate about a main gear axis of rotation co-linear with the roller axis of rotation;

a first pinion gear coupled to the at least one main gear, the first pinion configured to rotate about a first pinion gear axis of rotation parallel with the roller axis of rotation; and a second pinion gear coupled to the at least one main gear, the second pinion gear configured to rotate about a second pinion gear axis of rotation parallel with the roller axis of rotation; and one or more generators, the one or more generators including:

a first generator coupled to the first pinion gear, the first generator configured to generate power in the mobile communication device upon rotation of the roller and the gearing; and a second generator coupled to the second pinion gear, the second generator configured to generate power in the mobile communication device upon rotation of the roller and the gearing.

2. The apparatus of claim 1, wherein the one or more generators generates power by trickle charging one or more battery in the mobile communication device.

3. The apparatus of claim 1, wherein the one or more generators generates power by trickle charging one or more capacitor in the mobile communication device.

4. The apparatus of claim 1, wherein the apparatus is integrated in a user-replaceable battery cover of the mobile communication device.

5. The apparatus of claim 1, further comprising:
a rectifier circuit that adjusts the polarity of a signal coming from the roller upon movement in the clockwise and the counterclockwise direction.

6. The apparatus of claim 1, wherein the mobile communication device is one of a portable MP3 player, satellite radio receiver, AM/FM radio receiver, satellite television, portable music player, portable computer, wireless radio, wireless telephone, portable digital video recorder, cellular telephone, mobile telephone, and personal digital assistant (PDA).

7. An apparatus for creating power for a mobile communication device, comprising:
a roller integrated into the mobile communication device configured to rotate in a counterclockwise direction when the roller contacts a surface and is moved in a first direction, and rotates in a clockwise direction when the roller contacts a surface and is moved in second direction;
gearing connected to the roller, wherein the gearing rotates when the roller is moved;
one or more generator that creates power in the mobile communication device upon rotation of the roller and the gearing;
a diode array that converts alternating current to direct current; and
a voltage boost circuit that increases the voltage level necessary to charge a battery in the mobile communication device.

8. A mobile communication device, comprising:
a roller integrated into the mobile communication device configured to rotate in a counterclockwise direction when the roller contacts a surface and is moved in a first direction, and rotates in a clockwise direction when the roller contacts a surface and is moved in second direction;
gearing connected to the roller, wherein the gearing rotates when the roller is moved;
one or more generator that creates power in the mobile communication device upon rotation of the roller and the gearing;
a diode array that converts alternating current to direct current; and
a voltage boost circuit that increases the voltage level necessary to charge a battery in the mobile communication device.

9. The mobile communication device of claim 8, wherein the one or more generators creates power by trickle charging one or more battery in the mobile communication device.

10. The mobile communication device of claim 8, wherein the one or more generators creates power by trickle charging one or more capacitor in the mobile communication device.

11. The mobile communication device of claim 8, wherein the apparatus is integrated in a user-replaceable battery cover of the mobile communication device.

12. The mobile communication device of claim 8, further comprising:
a rectifier circuit that adjusts the polarity of a signal coming from the roller upon movement in the clockwise and the counterclockwise direction.

13. The mobile communication device of claim 8, wherein the mobile communication device is one of a portable MP3 player, satellite radio receiver, AM/FM radio receiver, satellite television, portable music player, portable computer, wireless radio, wireless telephone, portable digital video recorder, cellular telephone, mobile telephone, and personal digital assistant (PDA).

14. The mobile communication device of claim 8, wherein the gearing comprises:
one or more main gear connected to the roller, wherein at least one of the main gears rotate when the roller is moved; and
one or more pinions connected to the one or more main gear, wherein at least one of the pinions rotate when the roller and at least one of the main gears move.

15. A method of manufacturing an apparatus for providing power to a mobile communication device, comprising:
integrating a roller into the mobile communication device configured to rotate in a counterclockwise direction when the roller contacts a surface and is moved in a first direction, and rotates in a clockwise direction when the roller contacts a surface and is moved in second direction;
coupling gearing to the roller, wherein the gearing rotates when the roller is moved; and
coupling one or more generator to the gearing that creates power in the mobile communication device upon rotation of the roller and the gearing.

16. The method of claim 15, wherein the one or more generators creates power by trickle charging one or more battery in the mobile communication device and trickle charging one or more capacitor in the mobile communication device.

17. The method of claim 15, wherein the apparatus is integrated in a user-replaceable battery cover of the mobile communication device.

18. The method of claim 15, wherein the mobile communication device is one of a portable MP3 player, satellite radio receiver, AM/FM radio receiver, satellite television, portable music player, portable computer, wireless radio, wireless telephone, portable digital video recorder, cellular telephone, mobile telephone, and personal digital assistant (PDA).

* * * * *